March 17, 1942.    O. W. LIVINGSTON    2,276,851
ELECTRIC VALVE TRANSLATING SYSTEM
Filed May 5, 1941
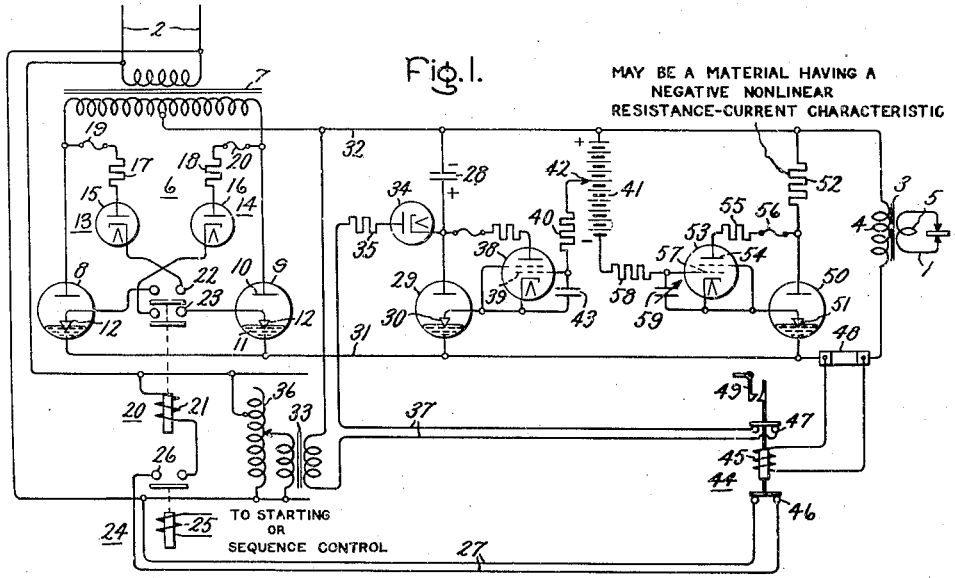
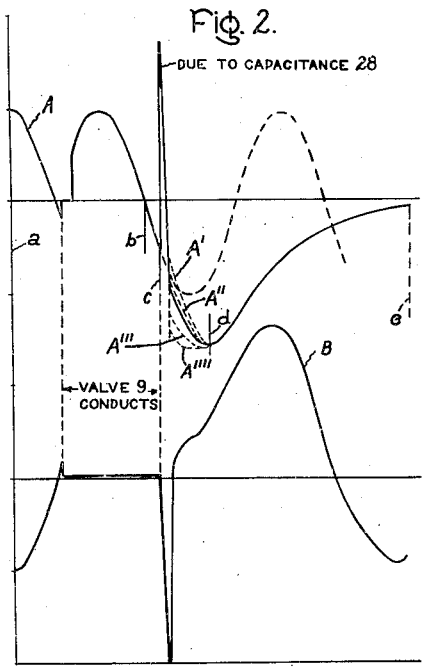
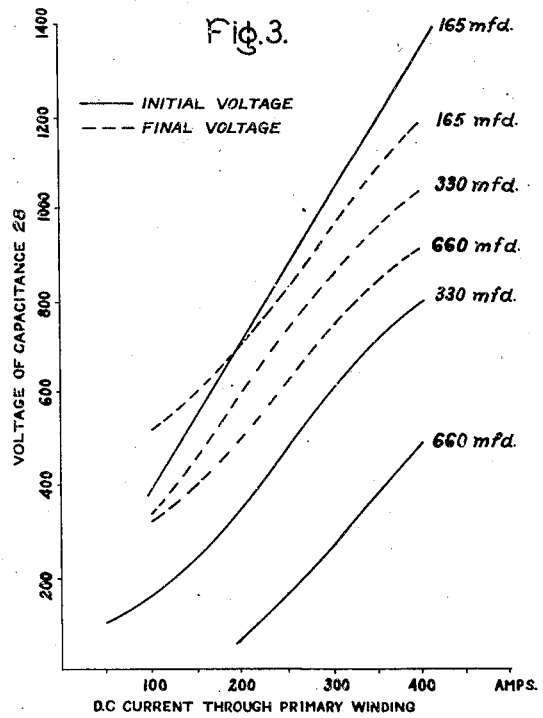
Inventor:
Orrin W. Livingston,
by Harry E. Dunham
His Attorney.

Patented Mar. 17, 1942

2,276,851

UNITED STATES PATENT OFFICE 2,276,851

ELECTRIC VALVE TRANSLATING SYSTEM

Orrin W. Livingston, Scotia, N. Y., assignor to General Electric Company, a corporation of New York Application May 5, 1941, Serial No. 392,018

8 Claims. (Cl. 171—97)

My invention relates to electric valve translating systems, and more particularly to systems employing electric valve apparatus for effecting energization of a load circuit through inductive apparatus wherein the electromagnetic energy stored in the inductance is transferred to the load circuit.

The subject matter of this application is an improvement in electric valve translating systems of the type disclosed and claimed in a copending patent application Serial No. 391,508 of George L. Rogers, filed May 2, 1941, and which is assigned to the assignee of this application. In accordance with the teachings of my invention described hereinafter I provide a new and improved system wherein energy may be transmitted to a load circuit from a suitable source of current and wherein the apparatus is controlled and protected so that it is not subjected to severe operating conditions but which permits the transfer of the desired amount of energy to the load circuit by using equipment of ordinate size and rating as compared with the amount of power to be transferred.

It is an object of my invention to provide a new and improved electric valve translating system.

It is another object of my invention to provide a new and improved electric valve translating system for energizing a load circuit, such as a welding circuit, and in which energy is stored in an inductance and transferred to the load circuit or a welding circuit by interruption of the current through the inductance.

It is a further object of my invention to provide a new and improved control or protective system for electromagnetic energy storage and dissipation systems wherein the apparatus employed is controlled or protected to prevent the application thereto of voltages which might be injurious to the equipment employed.

Briefly stated, in the illustrated embodiment of my invention I provide an electric valve translating system for transmitting an impulse of current to a load circuit from a source of current by supplying a unidirectional current to an inductance and by interrupting the flow of current through the inductance to effect transfer of the stored electromagnetic energy to the load circuit or welding circuit. I provide suitable means for limiting the voltage appearing across the inductance occasioned by the interruption of current thereby protecting the apparatus. This protective means may comprise a poled circuit including a resistance which may be of the type having a negative non-linear resistance-current characteristic which not only limits the voltage to a desired maximum value, but also effects this voltage limitation and protective operation by absorbing a much smaller amount of energy than that required by the prior art arrangements to effect the voltage limitation. In this manner the elements of the system are protected and the power losses are substantially reduced, thereby substantially improving the efficiency of the system.

For a better understanding of my invention reference may be had to the following description taken in connection with the accompanying drawing, and its scope will be pointed out in the appended claims.

Fig. 1 diagrammatically illustrates an embodiment of my invention as applied to a system which energizes a welding circuit from a single phase alternating current supply circuit; and Figs. 2 and 3 represent certain operating characteristics of the arrangement shown in Fig. 1.

In Fig. 1 of the drawing I have represented my invention as applied to a system for energizing a load circuit, such as a welding circuit 1, from a suitable source of power such as a single phase alternating current supply circuit 2. Energization of the welding circuit 1 is obtained by storing energy in the form of electromagnetic energy in an inductance by the transmission of current to the inductance, and subsequently effecting the transfer of this stored energy to the load circuit by interruption of the current. In the arrangement of Fig. 1, the inductance may be provided by a transformer 3 comprising primary winding 4 and a secondary winding 5. While I have chosen to illustrate my invention as comprising an inductance of a particular form, it will be appreciated that I may employ other forms of inductive equipment and that my invention applies with equal facility to equipments of that nature.

Unidirectional current is transmitted to the primary winding 4 of transformer 3 by means of a suitable rectifier 6 which may include a transformer 7 and a pair of electric valve means 8 and 9 which are preferably of the type employing an ionizable medium such as a gas or a vapor capable of supporting an arc discharge. Each of the electric valve means 8 and 9 comprises an anode 10, a cathode such as mercury pool cathode 11, and may include a control member such as an immersion ignitor control member 12 constructed of a material such as boron carbide or silicon carbide having an extremity thereof extending into the mercury pool. The electrical resistivity of the material constituting the control member 12 is relatively large as compared with that of the associated mercury; and the electric valve means are rendered conducting by the transmission of a predetermined value of current through the control members.

As excitation means for energizing the control members 12 of the electric valve means 8 and 9, I may employ excitation circuits 13 and 14 which are connected to be responsive to the polarity and magnitude of voltage impressed on associated electric valve means 8 and 9, respectively. Excitation circuits 13 and 14 comprise unidirectional conducting devices 15, 16, current limiting resistances 17, 18 and current protective devices such as fuses 19 and 20, respectively.

As a means for initiating operation of the rectifier 6, I employ a relay 20, having an actuating coil 21 and contacts 22 and 23, the latter of which are connected in excitation circuits 13 and 14, respectively. When the actuating coil 21 is energized, the excitation circuits are operatively connected in the system to transmit energizing impulses of the current to the control members 12 of electric valve means 8 and 9. It will be understood that I may, of course, employ electric valves each including a grid in place of the electric valves 15 and 16 and that the potential of the grids may be varied to determine the periods of conduction of the electric valve means 8 and 9. I also may employ a starting or sequence control relay 24 including an actuating coil 25 which may be energized from starting or sequence control apparatus, not shown, or may be energized in response to the operation of associated welding apparatus. The relay 24 includes contacts 26 which are connected in series relation with actuating coil 21 of relay 20. Contacts 26 are also connected in series relation with lock-out apparatus, described hereinafter, through circuit 27.

To interrupt the flow of current by the electric valve means 8 and 9, and to interrupt the flow of current through primary winding 4 of transformer 3, thereby effecting transfer of the stored electromagnetic energy to the welding circuit 1, I employ commutating means including, in series relation, a capacitance 28 and an electric valve means 29 which may also be of the type employing an ionizable medium, and comprising an immersion ignitor control member 30. The capacitance 28 and the electric valve means 29 are connected across the output circuit of the rectifier 6 including positive conductor 31 and negative conductor 32.

Capacitance 28 is provided with a charging circuit. Of course, capacitance 28 may be charged from any suitable source of direct current or may be charged from an alternating current circuit through rectifying equipment. In the embodiment of the invention illustrated, I have chosen to show the capacitance 28 as being energized from the alternating current circuit 2 through a transformer 33, a unidirectional conducting device 34, and a resistance 35. Suitable voltage control means may be employed for adjusting or controlling the magnitude of the charge which is established across the terminals of capacitance 28. I have illustrated this voltage controlling means as comprising an autotransformer 36. Means for preventing the charging operation of capacitance 28 from an external source during the commutation period and during the transfer period are also employed and may be accomplished by connecting relay apparatus in circuit 37. This relay apparatus is described hereinafter.

The commutating means including capacitance 28 and electric valve means 29 is rendered conducting or initiated in its operation by apparatus which is responsive to the polarity of the voltage appearing across primary winding 4 of transformer 3, or responsive to the relative instantaneous polarities of conductors 31 and 32. I may employ for this purpose an electric discharge device 38 which is connected to transmit current to control member 30 of electric valve means 29 in response to the polarity of the voltage appearing across the anode and cathode of the electric valve means 29. Electric discharge device 38 includes a control grid 39 which is connected to the conductor 32 through resistance 40, and a suitable voltage source or standard such as a battery 41 which may be provided with an adjustable contact 42. Adjustment of the contact 42 controls or adjusts the time at which the commutating means is brought into operation. A capacitance 43 may be connected across the grid 39 and cathode of electric discharge device 38 in order to absorb extraneous transient voltages.

The rectifier 6 is initiated in its operation by energization of relays 20 and 24, and the rectifier 6 is rendered nonconducting by means of apparatus responsive to the magnitude of the current transmitted to primary winding 4. For example, I employ a current responsive relay 44 having an actuating coil 45 and contacts 46 and 47. The actuating coil 45 may be energized in response to the voltage appearing across a shunt 48 which is connected in series relation with primary winding 4. Contacts 46 are connected in series relation with contacts 26 of relay 24 to remove excitation from electric valve means 8 and 9; and contacts 47 are connected in the charging circuit for capacitance 28. Relay 45 is also provided with a lock-out and reset means 49 so that contacts 46 and 47 are maintained in the open circuit positions in response to a single circuit controlling operation of relay 24. Relay 44 also initiates the operation of the commutating means through the action of the rectifier 6 in the manner described in detail hereinafter.

I provide means for limiting the voltage across the primary winding 4 of transformer 3 occasioned by the interruption of the current transmitted therethrough. This voltage limiting means may comprise a poled circuit. The polarization, or the selectivity of the circuit, to be responsive to voltage of a predetermined polarity may be accomplished by means of a suitable unidirectional conducting device such as an electric valve means 50. Electric valve means 50 may also be of the type comprising an ionizable medium capable of supporting an arc discharge, and may include an immersion ignitor control means 51. As a means for limiting the maximum voltage appearing across the winding 4 and as a means for minimizing the power loss or energy loss during the current limiting operation, I connect in series relation with the electric valve means 50 a resistance 52. This resistance may be of the type having a negative non-linear resistance-current characteristic such as a crystalline material having a negative hyperbolic resistance-current characteristic described and claimed in United States Letters Patent 1,822,-742, granted September 8, 1931, upon application of Karl B. McEachron, which is assigned to the assignee of the present application.

Electric valve means 50 may also be rendered conducting in response to the polarity and magnitude of the voltage appearing across primary winding 4, and an electric discharge device 53 may be employed for this purpose. The discharge device 53 is provided with an anode 54 which is connected to the anode of electric valve means 50 through a resistance 55 and a current protective means such as a fuse 56. Control grid 57 of electric discharge device 53 is connected to be responsive to the magnitude and polarity of the voltage of conductor 32 and may be connected to that conductor through battery 41 and resistance 58. Capacitance 59 may be connected across the cathode and control grid 57 of discharge device 53.

Capacitance 59 may be made adjustable in order to control the magnitude of voltage at which electric discharge device 53 and electric valve means 50 begin to conduct current, and hence may be employed to control the wave form of the voltage impressed on primary winding 4.

The operation of the embodiment of my invention shown in Fig. 1 will be explained by considering the system when it is desired to effect transmission of an impulse of current to the welding circuit 1. Initially the electric valve means 8 and 9 are nonconducting and of course current is not supplied to primary winding 4. Energization of actuating coil 25 of relay 24 effects energization of actuating coil 21 of relay 20 through contacts 26 and contacts 46 of relay 44, effecting thereby closure of contacts 22 and 23. The electric valve means 8 and 9 are rendered conducting alternately by means of excitation circuits 13 and 14, respectively, and conduct current during substantially 180 electrical degrees. As soon as arc discharges are established within electric valve means 8 and 9, the rectified current is transmitted substantially exclusively through these valves due to the low impedance or resistance of these paths as compared with that of the excitation circuits 13 and 14. It is to be noted further that in electric valve apparatus of this type the valves continue to conduct current until the anode-cathode circuit is interrupted or until the anode is made negative in potential relative to the cathode, or, in other words, until the cathode is made positive in potential relative to the anode.

After operation of relays 24 and 20, rectified unidirectional current is transmitted to winding 4. As soon as the unidirectional current attains a predetermined value, relay 44 operates opening its contacts 46 and 47. The charging circuit for capacitance 28 is opened, the circuit having previously established a charge of the polarity indicated on the plates thereof. Opening of contacts 46 immediately deenergizes relay 20 opening contacts 22 and 23 so that subsequent impulses of current will not be transmitted to control members 12. However, the electric valve which was conducting at the time of the operation of relay 20 nevertheless continues to conduct current due to the relatively high inductance of transformer 3. This electric valve will continue to conduct current even though its phase voltage is forced negative by the voltage of the associated portion of the secondary winding of transformer 7. This negative voltage which is impressed on the cathode of electric valve means 29 and the cathode of electric discharge device 38 renders these devices conducting. The value of reverse voltage derived from the transformer 7 at which these devices are rendered conducting is determined by the adjustment of contact 42. As soon as electric valve means 29 begins to conduct current there is impressed on the conductor 31 a positive voltage due to the capacitance 28. As soon as electric valve means 29 begins to conduct, a potential is impressed across conductors 31 and 32 due to the charge on the capacitance 28. The capacitance 28, having a more positive voltage than that of rectifier 6, effectively raises the load voltage causing the rectifier current to decrease to zero and thus permitting either electric valve 8 or 9, whichever was conducting at the time of operation of relay 20, to become nonconducting.

The capacitance 28 is of such size that it cannot long maintain conductor 31 positive with respect to conductor 32, but rapidly discharges, and due to the energy stored in the inductance of transformer 3 the potential is reversed, again making the conductor 31 negative with respect to conductor 32. Since considerable energy is stored in the inductance of transformer 3, it is possible that the voltage of capacitance 28 may be reversed to a dangerously high voltage were some means not provided to prevent the occurrence of this condition.

When the voltage appearing across the primary winding 4 reverses sufficiently, the electric valve means 50 is also rendered conducting to connect effectively resistance 52 in series relation across the primary winding, thereby limiting the magnitude of the voltage which appears across this winding due to the interruption of current. The magnitude of this reverse voltage at which the electric discharge device 53 and electric valve means 50 are rendered conducting is determined principally by the negative voltage furnished by battery 41 and may be adjusted by varying the magnitude of the bias voltage.

Resistance 52 is designed to have a value which will limit the voltage across primary winding 4 to a predetermined maximum value. That is, the resistance 52 is chosen or designed so that it offers the same ohmic resistance to the maximum current transmitted thereto as would be offered by that linear resistance required to limit the voltage to that particular maximum value. Consequently, due to the fact that the ohmic value of the resistance element 52 is substantially greater, that is, many times greater at lower current values, the energy dissipated in the resistance 52 during the complete voltage limiting operation is many times less than that incurred by employing a linear resistance.

After the interruption of current and the transfer of energy to the welding circuit 1, the system may be reset by removing the mechanical detent of the lock-out member 49 effecting closure of contacts 47 and 46. Then, if the relay 24 is energized, the above-described sequence of operation will be repeated.

The operating characteristics shown in Fig. 2 may be referred to in order to explain more particularly the operation of the system. The solid curve A of Fig. 2 represents the voltage appearing across the primary winding 4 of transformer 3. If it be assumed that rectifier 6 is conducting current, the portion of curve A lying within the interval $a-b$ represents the wave shape of the voltage applied to the primary winding 4. If the current responsive relay 44 operates, opening its contacts 46 and 47 prior to time $b$, the electric valve means which is conducting at that time will continue to conduct even though its phase voltage reverses in polarity, due to the presence of the inductance in the system. Consequently the electric valve, such as electric valve 9 which may be taken as an example, continues to conduct until time c, at which time the commutating means is initiated in its operation by means of electric discharge device 38 and electric valve 29. As a result, the voltage of conductor 31 is raised very rapidly to a positive value due to the charge of capacitance 28 and the capacitance discharges through electric valve 29, shunt 48, and primary winding 4. The charge on the capacitance reverses, and at time d, the voltage across capacitance 28 is of sufficient magnitude to render the electric valve means 29 nonconducting. During the interval c—d the electric valve 9 has also been rendered nonconducting so that the circuit for energizing primary winding 4 from the rectifier 6 has been completely interrupted. As a result, a substantial portion of the electromagnetic energy stored in the inductance 4 is transmitted to the welding circuit 1 during the interval c—e. The dotted sine curve of the upper portion of Fig. 2 represents the voltage which would be applied to electric valve means 9 by the right-hand section of the secondary winding of transformer 7. This voltage does not appear in the circuit for primary winding 4, but is shown to facilitate the explanation of the commutating means. Curve B of Fig. 2 represents the voltage appearing across the electric valve means 9 during its conduction period, during the commutation interval and the energy transmitting interval. It will be noted that during the period of its conduction, the voltage appearing thereacross is limited to the arc drop and that at time c its anode voltage is reversed substantially by the connection of capacitance 28 in the circuit. The time of reversal of the anode-cathode voltage, of course, must be greater than the de-ionization time of the valve; that is, during the commutation interval the reversal in polarity must exist for a time sufficient to permit the diffusion of the ions so that the medium returns to a non-ionized condition.

Adjustment of capacitance 59 in cooperation with the voltage of battery 41 controls the magnitude of the voltage of primary winding 4 at which electric discharge device 53 and electric valve means 50 begin to conduct current, and thereby permits control of the time during the cycle of operation at which the voltage limiting operation is initiated. As the magnitude of capacitance 59 is decreased, a greater value of reverse voltage is required to render electric discharge device 53 conducting. The dotted curves A', A'', A''', A'''', represent the effect of progressively increasing the value of the capacitance 59, in the order stated.

The operating characteristics shown in Fig. 3 represent in graph form the operating characteristics of the system in which different values of capacitance for capacitance 28 have been employed. These curves represent the operating characteristics when the resistance 52 is of constant or fixed value; that is, one not having a negative nonlinear resistance current characteristic. The solid curves are plotted as functions of the direct current transmitted through primary winding 4 and the voltage to which the capacitance is initially charged in order to obtain the desired satisfactory operation of the system. The dotted curves show the final voltages of the capacitance after the commutation operation.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a source of current, an inductance, a load circuit connected to said inductance, means for transmitting current from said source to said inductance, means for interrupting the current in said inductance to effect transfer to said load circuit of at least a portion of the electromagnetic energy stored in said inductance, and means comprising a series connected unidirectional conducting device and a resistance having a negative resistance-current characteristic connected across said inductance to limit the magnitude of the voltage appearing across said inductance due to the interruption of said current.

2. In combination, a source of current, an inductance, a load circuit connected to said inductance, means for transmitting current from said source to said inductance, means for interrupting the current in said inductance to effect transfer to said load circuit of at least a portion of the electromagnetic energy stored in said inductance, and means connected across said inductance to limit the voltage appearing thereacross due to the interruption of current, and comprising a poled circuit including a resistance having a negative non-linear resistance-current characteristic.

3. In combination, a source of current, an inductance, a load circuit connected to said inductance, means for transmitting current from said source to said inductance, means for interrupting the current in said inductance to effect transfer to said load circuit of at least a portion of the electromagnetic energy stored in said inductance, and means connected across said inductance to limit the magnitude of the voltage appearing thereacross occasioned by the interruption of the current and comprising a resistance of crystalline material having a negative hyperbolic resistance characteristic.

4. In combination, a source of current, an inductance, a load circuit connected to said inductance, means for transmitting current from said source to said inductance, means for interrupting the current in said inductance to effect transfer to said load circuit of at least a portion of the electromagnetic energy stored in said inductance, and a circuit connected across said inductance to limit the voltage appearing thereacross occasioned by the interruption of the current and comprising in series relation an electric discharge device including a control member and a resistance having a non-linear resistance-current characteristic, and means for energizing said control member to render the last mentioned circuit conducting in response to the polarity of the voltage appearing across said inductance.

5. In combination, an alternating current supply circuit, an inductance, a load circuit connected to said inductance, electric translating apparatus energized from said supply circuit and including electric valve means for transmitting unidirectional current to said inductance, means for interrupting the current through said inductance, means for limiting the magnitude of the voltage appearing across said inductance due to the interruption of the current, and means responsive to the magnitude and the polarity of the voltage appearing across said inductance for initiating operation of the voltage limiting means.

6. In combination, an alternating current supply circuit, an inductance, a load circuit connected to said inductance, electric translating apparatus energized from said supply circuit and including electric valve means for transmitting unidirectional current to said inductance, means for interrupting the current through said inductance, means for limiting the voltage across said inductance due to the interruption of the current therein and comprising a resistance and a controlled electric valve, means for rendering said controlled electric valve conducting in response to the magnitude and polarity of the voltage across said inductance, and means for controlling the magnitude of the voltage at which said controlled electric valve is rendered conducting.

7. In combination, an alternating current supply circuit, an inductance, a load circuit connected to said inductance, electric translating apparatus energized from said supply circuit and including electric valve means for transmitting unidirectional current to said inductance, means for interrupting the current through said inductance, means connected across said inductance to limit the voltage appearing thereacross occasioned by the interruption of the current and comprising in series relation a resistance and means including an electric discharge device having a control member, and a capacitance connected to said control member for controlling the magnitude of the voltage at which the voltage limiting means is initiated in its operation.

8. In combination, a supply circuit, a load circuit, an inductive device, translating apparatus connected between said supply circuit and said inductive device for effecting transmission of current to said inductive device, means for interrupting the flow of current to said inductive device, and means to prevent subsequent reversal of voltage across said inductance comprising in series relation a unidirectional conducting device and a resistance having a negative nonlinear resistance-current characteristic.

ORRIN W. LIVINGSTON.